(12) United States Patent
Lee

(10) Patent No.: US 7,760,528 B2
(45) Date of Patent: Jul. 20, 2010

(54) METHOD AND APPARATUS FOR PROVIDING HIGH SPEED, LOW EMI SWITCHING CIRCUITS

(75) Inventor: Yongman Lee, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 341 days.

(21) Appl. No.: 12/004,591

(22) Filed: Dec. 21, 2007

(65) Prior Publication Data

US 2009/0160346 A1    Jun. 25, 2009

(51) Int. Cl.
*H02M 7/00*    (2006.01)

(52) U.S. Cl. .................. 363/123; 363/126; 363/124; 363/15; 363/21.12; 315/247; 315/246; 315/209 R; 315/224; 307/139; 307/140; 307/141.8; 307/112

(58) Field of Classification Search .......... 307/139, 307/140, 141.8, 112, 116, 141.4; 315/247, 315/246, 224, 225, 209 R, 219; 363/123, 363/126, 124, 127, 131, 125, 15, 21.12
See application file for complete search history.

(56) References Cited

U.S. PATENT DOCUMENTS 5,030,852 A * 7/1991 Higashisaka ............ 307/448

5,751,120 A * 5/1998 Zeitler et al. .............. 315/307

OTHER PUBLICATIONS

Marty Brown: "Considerations in Designing the Printed Circuit Boards of Embedded Switching Power Supplies"; Fairchild, Application Note AN-1031, pp. 1-15, Apr. 30, 1999.
International Search Report and Written Opinion of Feb. 17, 2009 in related copending Patent Cooperation Treaty International Patent Application No. PCT/US2008/008681.

* cited by examiner

*Primary Examiner*—Tuyet Vo
(74) *Attorney, Agent, or Firm*—Kramer Levin Naftalis & Frankel LLP

(57) ABSTRACT

Methods and apparatus are provided for generating low EMI display driver power supply. The methods and apparatus include switching circuits that utilize two groups of parallel circuit traces, each of which is coupled to one end of a switching device. The two groups of traces are configured to be interleaved with each other such that no two traces from either group are next to any other traces from the same group. When the switching device is activated, current flows through the circuit and charges an energy storage element. When the switching device is deactivated, the energy storage element discharges a portion of its energy to a second energy storage element and to the driver circuits. In another embodiment, an additional circuit trace is provided which is only connected on one end and is free floating on the other end to capture the majority of EMI remaining that was generated by the switching circuit.

24 Claims, 4 Drawing Sheets

METHOD AND APPARATUS FOR PROVIDING HIGH SPEED, LOW EMI SWITCHING CIRCUITS

BACKGROUND OF THE INVENTION

This relates to switching circuitry that may be used to drive display drivers, and particularly to providing switching circuitry that operates at switching high speeds while producing low EMI output.

There are various well known techniques for generating supply voltages to display driver circuits. In one instance, for example, a charge pump circuit may be used to act as a high voltage power source for a display driver. In that instance, the charge pump could be configured to first charge a capacitor to a given voltage from a battery. Once charged, the capacitor may be placed in a series connection with the battery to effectively double the output voltage. For example, a 3 volt battery may be used to charge a capacitor, which could then be placed in series with the battery to provide a 6 volt output. Charge pumps often operate at relatively high energy efficiencies, but often don't provide as much current as other methods, such as a switching regulator. For example, typical charge pumps provide energy at power conversion efficiency on the order of about 90%.

Another well known technique for providing energy to display driver circuits is to use a switching regulator circuit. In a switching regulator circuit, a switch is used to charge and discharge an active element, such as an inductor, to provide an output voltage. Switching regulators are often used to supply high current, however, such circuits typically generate radiated energy as part of the switching process. The radiated energy is often observed as noise on the circuits surrounding the switching regulator. Switching regulator circuits often produce lower power conversion efficiency, which can be on the order of 80-85% efficiency.

Charge pump circuits may provide energy without the introduction of noise, however, that energy is produced at a lower current driving capability due to the large internal resistance of such circuits. This may not be an issue in instances where the display itself is relatively small, such as the display on an Apple iPod Nano product. However, conventional charge pump circuits may not be able to provide the current necessary to drive a larger display, such as the ones used on Apple's iPhone and iPod Touch products.

SUMMARY OF THE INVENTION

In accordance with embodiments of the invention, methods and apparatus are provided for generating supply voltages for display driver circuits at very high efficiencies and with low quantities of radiated energy (i.e., low noise). In particular, the methods and apparatus are provided to utilize switching regulator circuits that have been modified such that multiple circuit paths are created which carry electric current in opposite directions in order to cancel out the radiated noise of each path. In addition, additional terminal lines are provided which act to sink any electromagnetic interference (EMI) generated in the outermost paths that are actively coupled to the circuit (e.g., the paths in which current flows).

Embodiments of the present invention provide the capability to produce relatively large amounts of current, which can be used in driver circuits for relatively large displays such as the Apple iPhone display, without incurring the typical penalties associated with EMI or noise in such implementations. In conventional implementations of chip on glass (COG), an integrated circuit (IC) may be located on one side of the glass used in displays. The IC may include a transistor which operates as the switch in the switching regulator. The transistor may include multiple parallel leads connected to the source and multiple parallel leads connected to the drain. The leads may be connected to a piece of flex circuitry to complete the circuit via circuit elements formed of indium tin oxide (ITO). ITO is particularly useful in display applications because it is a transparent material, but it has a high resistance (it may be on the order of about 10 ohms or so), which can result in a voltage drop of about 500 millivolts.

In one embodiment of the present invention, the parallel source and drain paths are configured in an alternating relationship, such that a source path to ground is placed between each two drain paths which are configured to provide the output voltage. In this manner, the EMI generated in the source paths is cancelled by the EMI generated in the drain paths, because the currents through them flow in the opposite direction to each other.

In another embodiment of the present invention, the reduction in EMI is more pronounced by the use of a terminal lead (i.e., a lead that is only connected at one end) at the periphery edges of the circuit. The terminal leads act essentially as RF antennas to pick up any leaking fields generated by the last fully-connected paths in the circuit.

Various other alternative embodiments are possible.

Therefore, in accordance with the present invention, there is provided methods and apparatus for producing sufficient current to drive circuits for relatively large displays, such as the Apple iPhone, which do not generate the electromagnetic interference (EMI) typically associated with such circuits. In addition, the reduction in EMI can be increased through the use of terminal leads.

Media player apparatus operating in accordance with the methods and circuits of the present invention are also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
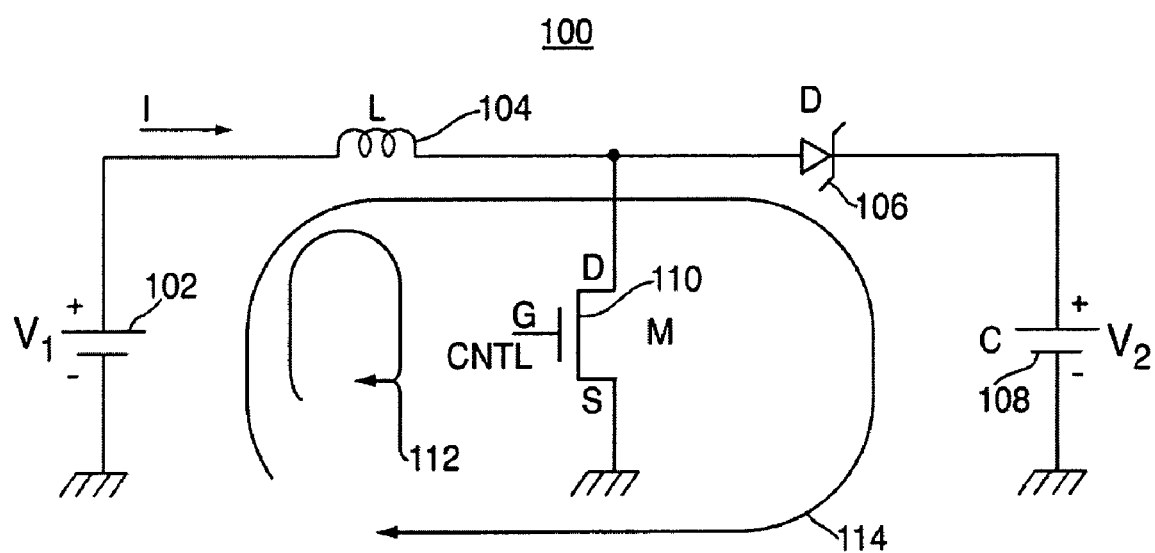
FIG. 1 is a schematic diagram of a switching regulator which may be used in accordance with an embodiment of the present invention.

FIG. 1 shows a switching regulator circuit 100 that can be implemented in accordance with the principles of the present invention. Switching regulator 100 may include a voltage source 102 that produces a voltage V, an inductor 104 that stores a current I, a diode 106 that prevents energy from the output device from being drained by the switching regulator, and a transistor switch 110. Diode 106 is coupled to capacitor 108, which provides the output voltage to the display driver circuit (not shown). As shown, voltage source 102 is configured to be connected between ground and inductor 104. Inductor 104 may be coupled to both diode 106 and to the drain of transistor 110 to provide operation as described below. The source of transistor 110 is coupled to ground, while the gate of transistor 110 is coupled to a control line. This configuration is commonly known as a boost regulator.

Figure 2:
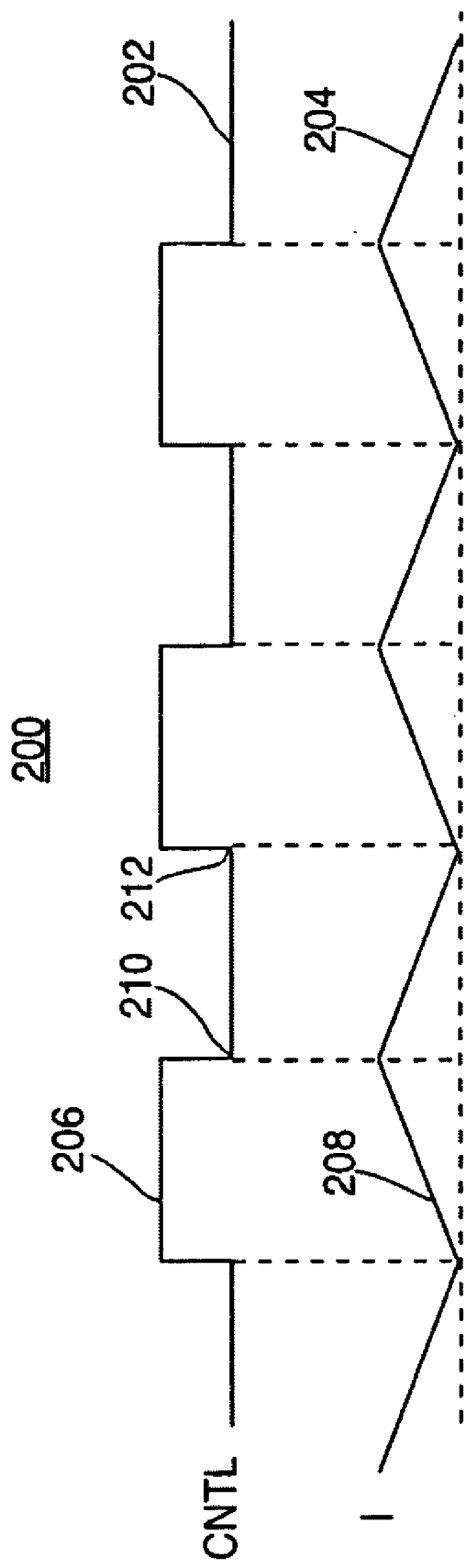
FIG. 2 is a timing diagram depicting the operation of a switching regulator such as the switching regulator shown in FIG. 1 in accordance with an embodiment of the present invention.

FIG. 2 shows a control timing diagram 200 that may be used to show the operation of switching regulator 100. Timing diagram 200 may include, for example, control trace 202, which would be the control signal applied to the gate of transistor 110 of FIG. 1. Timing diagram 200 may also include current trace 204, which shows the current being conducted by inductor 104 of FIG. 1. If the current passing through inductor 104 remains constant, there will be essentially no voltage drop across inductor 104 (a negligible drop related to the copper used to form the windings of inductor 104 will occur).

Switching regulator 100 may be operated in the following manner. When the control signal 202 is HIGH, for example at time 206, the voltage on the gate of transistor 110 causes current to flow from the drain to the source of transistor 110 (and then on to ground). Thus, voltage source 102 provides an input voltage to inductor 104 that causes the current flowing through inductor 104 to ramp up, as shown at time 208 in current trace 204 (as shown by arrow 112 in FIG. 1). Once the control signal at the gate of transistor 110 switches to a LOW state, as shown at time 210 in FIG. 2, the switch end of inductor 104 (i.e., the end coupled to diode 106 and to transistor 110) swings positive, which causes diode 106 to become forward-biased. This causes current to flow through diode 106 and through capacitor 108 to ground, thereby enabling capacitor 108 to be charged to a voltage that is higher than the voltage of source 102. Thus, at that time, the circuit follows the path shown by arrow 114 in FIG. 1.

The output voltage V2 across capacitor 108 may vary slightly as the switch turns ON and OFF. However, the speed at which the switching occurs may result in little variance in the output voltage V2. This is why the "efficiency" of switching is so high (90% or higher). While the gate of transistor 110 is in the LOW (or OFF) state, the current flowing from inductor 104 will actually flow to both capacitor 108, as well as to the load connected to capacitor 108. In order to limit the current flowing from diode 106 from falling below a certain level, at time 212, for example, the control signal applied to the gate of transistor 110 switches back to a HIGH state, once again causing the circuit to operate as indicated by arrow 112 in FIG. 1. During that time, the output load is provided energy solely from capacitor 108, as inductor 104 is charged back up.

Figure 3:
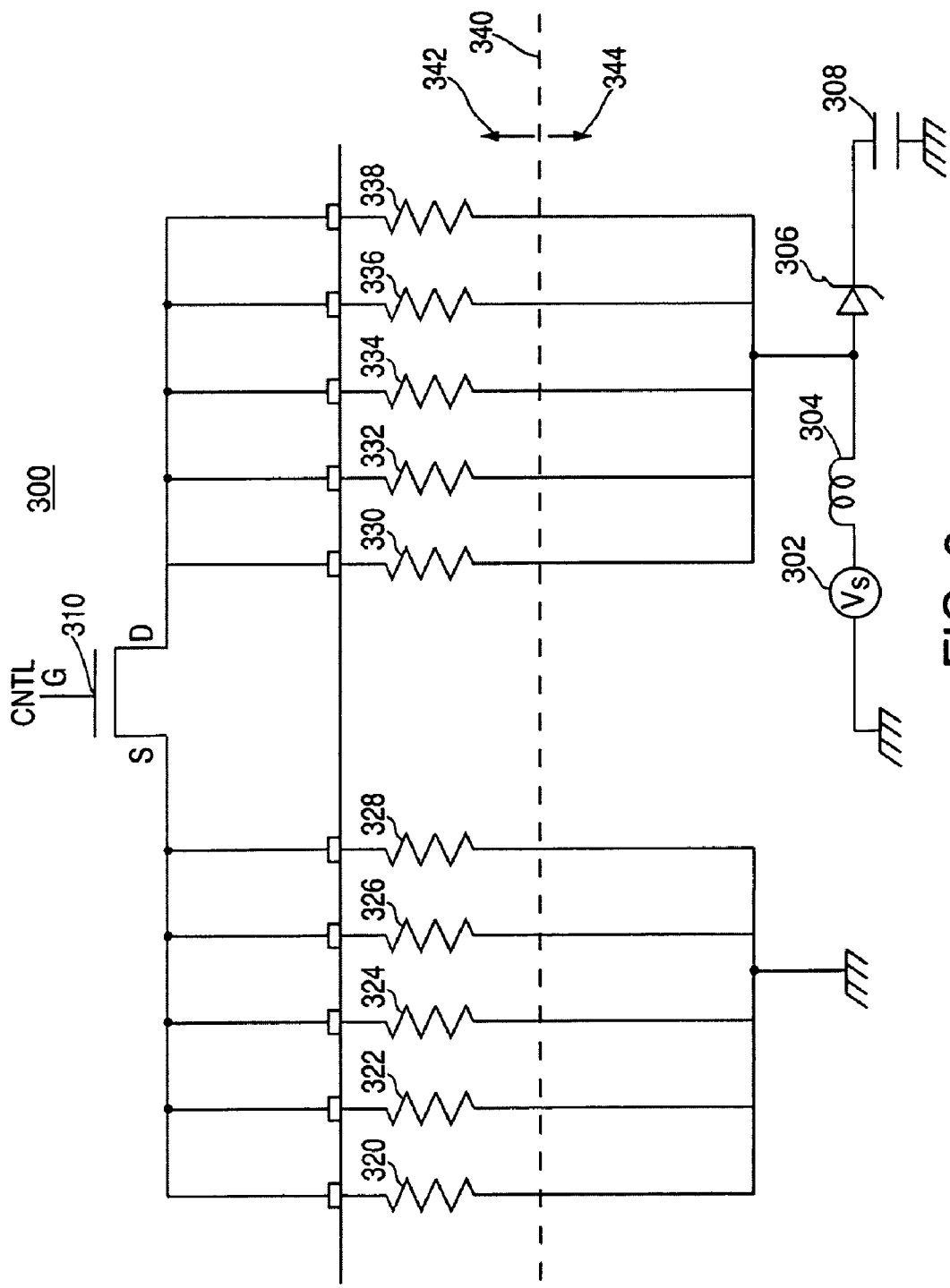
FIG. 3 is a schematic diagram of a conventional implementation of a switching regulator to provide drive current to a digital display in accordance with an embodiment of the present invention.

FIG. 3 shows one implementation of a switching regulator circuit 300 used to generate direct voltage (DC) for a digital video display (not shown). Switching regulator 300 may include inductor 304, diode 306 and transistor 310 (elements 304, 306 and 310 may be similar to those previously described with respect to FIG. 1). Instead of using a substance such as copper or gold for the bonding wire, however, it may be preferable to use indium tin oxide (ITO) because it is transparent (which is needed since the circuit is being used to drive a display). ITO, unlike gold, has a relatively high resistance, which can be something on the order of about 10 ohms, but can be as high as 50 ohms or more. In order to reduce the resistance, multiple traces are used for a single switch. For example, by breaking up a signal which would have had a resistance of 50 ohms into four paths, the resistance of each path drops to 12.5 ohms (50 divided by 4).

FIG. 3 also shows a series of resistors 320-328 that are coupled in parallel between the source of transistor 310 and ground, as well as a series of resistors 330-338 that are coupled between the drain of transistor 310 and inductor 304 and diode 306. Each of these "resistors" is not an actual, physical, resistor that has been coupled into regulator 300. Instead, each of these resistors represents the resistance of the ITO material that is used as a "bonding wire" in regulator 300. In addition to the components shown, regulator 300 also includes voltage source 302 and capacitor 308, both of which operate as previously described with respect to FIGS. 1 and 3 (in which similarly numbered elements were described— e.g., voltage source 102 in FIG. 1 versus voltage source 302 in FIG. 3). The division between glass and flex circuitry is shown generally by dashed line 340, such that the "glass" side is represented by arrow 342, while the "flex" side is represented by arrow 344.

As generally described above, regulator 300 operates in a manner similar to that of regulator 100. As the gate of transistor 302 is switched from LOW to HIGH, current flowing through inductor 304 will ramp up causing diode 306 to become reverse-biased (and thereby to act as a blocking diode). Current will continue to flow through parallel "resistors" 330-338, through transistor 310, and through parallel "resistors" 320-328. When the gate of transistor 310 is switched from HIGH to LOW, current flows directly from inductor 304 through diode 306 (which is then forward-biased), to capacitor 308, which charges capacitor 308 to a voltage higher than the voltage of voltage source 302, as well as providing current from inductor 304 directly to the load attached to capacitor 308.

One of the problems associated with the use of regulators like regulator 300 is the relatively large amount of EMI produced by the circuit. This is particularly troublesome in instances where the regulator circuit is being used to drive a display of a device that may be susceptible to such interference, such as a cellular or WIFI communications device (although the EMI problems could, in fact, negatively affect such operations as the playback of audio or video files). In those instances, the interference may cause an unacceptable degradation in the quality of the transmitted and/or received signals that the user's experience becomes virtually intolerable. Alternatively, the generation of EMI may require the hardware designers to implement complicated and potentially expensive solutions to deal with the EMI. These solutions could also potentially add to the overall weight and/or size of the device that the regulator is to be used in.

Figure 4:
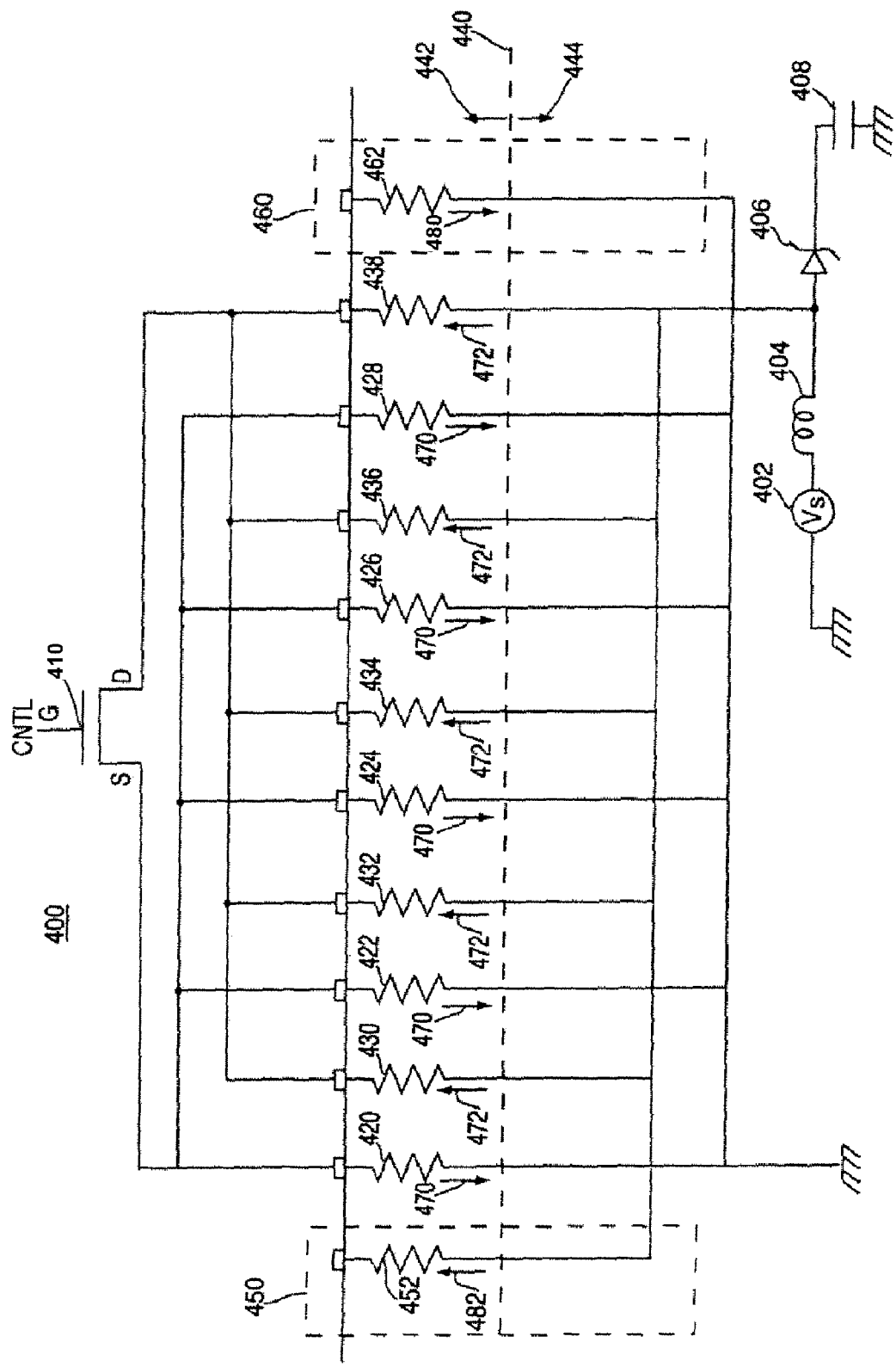
FIG. 4 is a schematic diagram illustrating various embodiments of the present invention.

FIG. 4 shows a switching regulator 400 which has been configured to operate in accordance with the principles of the present invention. Switching regulator 400 provides a high efficiency output which is capable of driving relatively large digital video displays with low EMI emissions. The displays can be on the order of the size of, for example, an Apple iPhone of Apple iPod Touch, or even larger.

Switching regulator 400 includes voltage source 402, inductor 404, diode 406, capacitor 408 and transistor 410. Each of these components operates in a similar manner as described above with respect to FIGS. 1 and 3. In addition, switching regulator 400 includes source "resistances" 420-428 and drain "resistances" 430-438 which, as described above, are not discrete, physical resistors, but are, in fact, representative of the resistance which occurs from the use of indium tin oxide instead of gold for the bonding wire. The division between the glass and the flex circuitry is generally indicated by dashed line 440, with arrow 442 indicating generally the glass side, and arrow 444 generally indicating the flex side.

Unlike the configuration shown in FIG. 3, switching regulator 400 produces little to no electromagnetic interference.

This is accomplished by configuring the parallel source paths and the parallel drain paths in a specific manner. In particular, in accordance with the principles of the present invention, the parallel source paths are interleaved with the parallel drain paths. For example, drain path 430 is configured to be in between parallel source paths 420 and 422. Source path 422 is between parallel drain paths 430 and 432. Drain path 432 is between parallel source paths 422 and 424, and so on.

The interleaving of source and drain paths provides the positive result that EMI produced on one path is substantially cancelled by the EMI produced on one or more adjacent paths. This is illustrated in FIG. 4 by arrows 470 and 472. Arrows 470 show that, when the control signal applied to the gate of transistor 410 is HIGH (and current is flowing through transistor 410), the current through the source paths is flowing downward, from the glass area to the flex area. At the same time, however, the current flowing through drain paths is flowing upward, from the flex to the glass, as shown by arrows 472. Since the current flowing through a source path should be substantially the same as the current flowing through a drain path, but in the opposite direction, the EMI generated in one path should be substantially cancelled out by the EMI generated in the other path.

Operation of switching regulator 400 is similar to the operation described previously with respect to FIGS. 1-3, except that switching regulator produces significantly less EMI and/or noise than the previously described switching regulators. When the control signal applied to the gate of transistor 410 is HIGH, such that current flows through transistor 410, EMI produced through the source paths is essentially canceled by the EMI produced through the drain paths, which is traveling in the opposite direction. When the control signal applied to the gate of transistor 410 is LOW, current flows from inductor 404 and does not pass through transistor 410. Accordingly, little to no EMI is generated in that instance as well.

An additional embodiment of the present invention is also shown in FIG. 4. It may be additionally advantageous, in accordance with the principles of the present invention, to provide two additional paths, shown as dashed components 450 and 460, to further reduce EMI effects, while maintaining a highly efficient switching regulator. In particular, it may be advantageous to add an additional drain path shown by "resistance" 452, as well as an additional source path shown by "resistance" 462. These paths are configured such that they are "terminal" paths, in that they are only connected at one end. Moreover, because of this configuration, there will not be any current flowing through these paths. However, the paths will still operate to pick up any leaking EMI field generated by the adjacent paths. This pick up effect is indicated by arrows 480 and 482. For example, arrow 480 is shown to be pointing toward the bottom of FIG. 4, to indicate that it will absorb any counter leaking EMI in the opposite direction as indicated by arrow 472 on path 438. The terminal paths would only be necessary next to the outer most fully functional paths (i.e., in FIG. 4, the outer most fully functional paths are shown by reference numerals 420 and 438).

Thus it is seen that methods and apparatus for producing low EMI energy at levels necessary to drive varying sizes of digital displays are provided. The present invention produces current sufficient to drive relatively large digital displays, such as the touch screen on the Apple iPhone, without generating the negative effects of high EMI radiation. It will be understood that the foregoing is only illustrative of the principles of the invention, and that various modifications can be made by those skilled in the art without departing from the scope and spirit of the invention, and the present invention is limited only by the claims that follow.

What is claimed is:

1. Apparatus for generating supply voltages to drive a digital display comprising:
    a switching transistor having a gate, a source and a drain;
    a first plurality of circuit paths coupled between said source and ground;
    an inductor;
    a voltage supply coupled between a first end of said inductor and ground;
    a diode having an anode connected to a second end of said inductor, and a cathode;
    a capacitor coupled between said cathode of said diode and ground; and
    a second plurality of circuit paths coupled between said drain and a junction between said inductor and said anode of said diode, said first and second plurality of circuit paths being interleaved with each other such that none of said first and second plurality of circuit paths are adjacent a circuit path of the same plurality.

2. The apparatus of claim 1 wherein said first plurality of circuit paths comprises:
    circuit traces formed from indium tin oxide (ITO).

3. The apparatus of claim 2 wherein said second plurality of circuit paths comprises:
    circuit traces formed from indium tin oxide (ITO).

4. The apparatus of claim 1 wherein said gate of said transistor is coupled to control circuitry that controls the rate at which said transistor switches between HIGH and LOW states.

5. The apparatus of claim 1, further comprising:
    a source leaking field pick up trace coupled at one end to said source and free-floating at another end, said source pick up trace being configured such that it is only adjacent one of said second plurality of circuit traces and that it is not adjacent any of said first plurality of circuit traces.

6. The apparatus of claim 1, further comprising:
    a drain leaking field pick up trace coupled at one end to said drain and free-floating at another end, said drain pick up trace being configured such that it is only adjacent one of said first plurality of circuit traces and that it is not adjacent any of said second plurality of circuit traces.

7. A circuit for generating supply voltages to drive a display comprising:
    a switching element;
    a voltage supply;
    a first energy storage element coupled at a first end to said voltage supply;
    a second energy storage element coupled between another end of said first energy storage element and ground;
    a first plurality of circuit traces between one portion of said switching element and ground; and
    a second plurality of circuit traces between a second portion of said switching element and a junction between said first and second energy storage elements, said first and second plurality of circuit traces being interleaved with each other such that each circuit trace is adjacent a circuit trace of the opposite plurality or is not adjacent to any circuit trace.

8. The circuit of claim 7, wherein said switching element comprises:
    a transistor.

9. The circuit of claim 7 wherein said first energy storage element comprises:
    an inductor.

10. The circuit of claim 7 wherein said second energy storage element comprises:
a capacitor.

11. The circuit of claim 7 further comprising:
a diode having an anode coupled to said another end of said first energy storage element and a cathode coupled to said second energy storage element, such that said diode is coupled between said first and second energy storage elements.

12. The circuit of claim 7 further comprising:
a first leaking field pick up trace coupled at one end to said first plurality of circuit traces and being unconnected at another end, said first pick up trace being configured to be adjacent to only one of said second plurality of circuit traces and to none of said first plurality of circuit traces.

13. The circuit of claim 12 further comprising:
a second leaking field pick up trace coupled at one end to said second plurality of circuit traces and being unconnected at another end, said second pick up trace being configured to be adjacent to only one of said first plurality of circuit traces and to none of said second plurality of circuit traces.

14. A method of generating low EMI energy for driving one or more display drivers comprising:
switching a switching element between a HIGH state and a LOW state, said HIGH state causing current to flow through said switching element;
directing said flowing current through a first plurality of parallel circuit traces between one portion of said switching element and ground;
conducting at least a portion of said current from ground through a source of energy to an inductor; and
causing at least a portion of said current to pass from said inductor through a second plurality of parallel circuit traces to a second portion of said switching element, said first and second pluralities of circuit traces being aligned such that all of said first plurality of circuit traces are adjacent to one or two of said second plurality of circuit traces and are not adjacent to any of said first plurality of circuit traces.

15. The method of claim 14 wherein switching comprises:
removing a control signal from the gate of a transistor.

16. The method of claim 15 further comprising:
sending current from said inductor to a capacitor coupled to said one or more display drivers only when said control signal is removed.

17. The method of claim 14 further comprising:
picking up fields leaking from one of said second plurality of circuit traces using an additional one of said first plurality of circuit traces, said additional one of said first plurality of circuit traces being coupled at one end to at least one other of said first plurality of circuit traces and being free at another end, and being only adjacent to one of said second plurality of circuit traces.

18. The method of claim 14 further comprising:
picking up fields leaking from one of said first plurality of circuit traces using an additional one of said second plurality of circuit traces, said additional one of said second plurality of circuit traces being coupled at one end to at least one other of said second plurality of circuit traces and being free at another end, and being only adjacent to one of said first plurality of circuit traces.

19. A portable media device comprising:
a digital display;
display driver circuitry; and
switching regulator circuitry coupled to said display driver circuitry that generates low EMI energy and supplies said low EMI energy to said display driver circuitry, said switching regulator comprising:
a switching transistor having a gate, a source and a drain;
an inductor;
a voltage supply coupled between one end of said inductor and ground;
a first plurality of parallel circuit traces coupled between said source and ground; and
a second plurality of parallel circuit traces coupled between said drain and another end of said inductor, said first and second plurality of parallel circuit traces being configured such that no two circuit traces of the same plurality are adjacent to one another.

20. The portable media device of claim 19, wherein said switching regulator circuitry further comprises:
a capacitor coupled between said second plurality of parallel circuit traces and ground.

21. The portable media device of claim 20, wherein said switching regulator circuitry further comprises:
a diode having an anode coupled to said second plurality of circuit traces and to said another end of said inductor, and a cathode coupled to said capacitor.

22. The portable media device of claim 19 wherein said switching regulator circuitry further comprises:
a first leaking field pick up circuit element coupled to said first plurality of parallel circuit traces, said first leaking field pick up circuit element being configured to be adjacent to one and only one of said second plurality of parallel circuit traces.

23. The portable media device of claim 22 wherein said switching regulator circuitry further comprises:
a second leaking field pick up circuit element coupled to said second plurality of parallel circuit traces, said second leaking field pick up circuit element being configured to be adjacent to one and only one of said first plurality of parallel circuit traces.

24. A display panel comprising:
a piece of display glass;
display driver circuitry mounted to said glass;
voltage supply generation circuitry electrically coupled to said display driver circuitry, said voltage supply generation circuitry comprising:
a switching transistor having a gate, a source and a drain;
a first plurality of circuit paths coupled between said source and ground;
an inductor;
a voltage supply coupled between a first end of said inductor and ground;
a diode having an anode connected to a second end of said inductor, and a cathode;
a capacitor coupled between said cathode of said diode and ground; and
a second plurality of circuit paths coupled between said drain and a junction between said inductor and said anode of said diode, said first and second plurality of circuit paths being interleaved with each other such that none of said first and second plurality of circuit paths are adjacent a circuit path of the same plurality.

* * * * *